(12) United States Patent
Clukies (10) Patent No.: US 7,520,977 B2
(45) Date of Patent: Apr. 21, 2009

(54) WATER POLLUTION PREVENTION AND REMEDIATION APPARATUS

(75) Inventor: Paul Arthur Clukies, 10115 Savannah Sparrow Way, Highlands Ranch, CO (US) 80129

(73) Assignee: Paul Arthur Clukies, Highlands Ranch, CO (US)

( * ) Notice: Subject to any disclaimer, the term of this patent is extended or adjusted under 35 U.S.C. 154(b) by 472 days.

(21) Appl. No.: 11/303,489

(22) Filed: Dec. 16, 2005

(65) Prior Publication Data
US 2006/0096927 A1   May 11, 2006

Related U.S. Application Data

(63) Continuation-in-part of application No. 10/342,595, filed on Jan. 15, 2003, now Pat. No. 7,138,055.

(51) Int. Cl.
C02F 1/40 (2006.01)
(52) U.S. Cl. .............. 210/111; 210/242.4; 210/416.1
(58) Field of Classification Search .......... 210/111, 210/242.4, 416.1, 460; 415/24, 121.2; 114/183 R
See application file for complete search history.

(56) References Cited

U.S. PATENT DOCUMENTS

| | | | |
|---|---|---|---|
| 3,537,587 A | 11/1970 | Kain | 210/242 |
| 3,679,058 A | 7/1972 | Smith | 210/242 |
| 3,702,657 A | 11/1972 | Cunningham et al. | 210/242 |
| 3,739,913 A | 6/1973 | Bogosian | 210/242 |
| 3,802,806 A * | 4/1974 | Blum | 417/423.3 |
| 3,888,766 A | 6/1975 | DeYoung | 210/36 |
| 3,960,719 A | 6/1976 | Bresson | 210/23 |
| 3,976,570 A | 8/1976 | McCray | 210/30 |
| 3,996,136 A | 12/1976 | Jakubek et al. | 210/86 |
| 4,031,839 A | 6/1977 | Pedone | 114/270 |
| 4,130,489 A | 12/1978 | Black | 210/242.4 |
| 4,461,614 A * | 7/1984 | Niedermeyer | 417/423.9 |
| 4,784,773 A | 11/1988 | Sandberg | 210/691 |
| 4,915,823 A | 4/1990 | Hall | 210/95 |
| 4,981,097 A | 1/1991 | Beyrouty | 114/228 |
| 5,186,831 A | 2/1993 | DePetris | 210/242.4 |
| 5,227,072 A | 7/1993 | Brinkley | 210/671 |
| 5,458,773 A | 10/1995 | Holland | 210/282 |
| 5,730,868 A | 3/1998 | Cordani | 210/242.4 |
| 5,948,266 A | 9/1999 | Gore et al. | 210/693 |

(Continued)

*Primary Examiner*—Matthew O Savage
(74) *Attorney, Agent, or Firm*—Marsh Fischmann & Breyfogle LLP (57) ABSTRACT

A fluid pollution prevention system for preventing the discharge of hazardous waste from a bilge of a marine vessel, and removal of the same from the bilge. The system includes an absorber for absorbing hazardous waste from a fluid in the bilge. The system further includes a pump that locates the absorber in a predetermined orientation relative to the pump to prevent the discharge of hazardous waste from the bilge. In one embodiment of the invention, the pump includes a housing having an outside surface that is adapted for disposition within an enclosed area defined by the absorber. According to this characterization, the absorber is movable along the outside surface of the pump housing as a function of the bilge fluid level to absorb hazardous waste from the fluid and isolate an inlet of the bilge pump from receipt of the same. In a further characterization, the fluid outlet vertically exits the pump housing such that the fluid outlet does not interference with the movement of the absorber.

23 Claims, 8 Drawing Sheets

U.S. PATENT DOCUMENTS

| | | | |
|---|---|---|---|
| 6,235,201 B1 | 5/2001 | Smith et al. | 210/691 |
| 6,390,780 B1 * | 5/2002 | Batchelder et al. | 417/36 |
| 6,398,966 B1 | 6/2002 | Smith et al. | 210/691 |
| 6,409,924 B1 | 6/2002 | Johnson | 210/691 |
| 6,712,957 B2 | 3/2004 | Papke | 210/112 |
| 7,138,055 B2 | 11/2006 | Clukies | |
| 2004/0134858 A1 * | 7/2004 | Clukies | 210/691 |
| 2007/0086888 A1 * | 4/2007 | Patel et al. | 415/177 |

* cited by examiner

WATER POLLUTION PREVENTION AND REMEDIATION APPARATUS

CROSS REFERENCE TO RELATED APPLCATION

This application is a continuation-in-part of U.S. patent application Ser. No. 10/342,595 entitled "Water Pollution Prevention and Remediation Apparatus," which was filed on Jan. 15, 2003, now U.S. Pat. No. 7,138,055.

FIELD OF THE INVENTION

The invention is related to the field of water pollution prevention, and in particular, to preventing the discharge of hazardous waste, and recovery of the same, from a marine vessel.

BACKGROUND OF THE INVENTION

By design, substantially all potential fluid containment areas of a marine vessel, e.g., boat, offshore drilling platform, etc. drain toward a common collecting area known as a bilge. The bilge is typically located in a lower or bottom portion of a vessel and includes a pump. The pump is referred to in the art as a bilge pump, and upon accumulation of a predetermined amount of fluid in the bilge, the bilge pump is designed to pump the collected fluid overboard of the vessel.

An automatic switch activated by a float ("float switch"), controls operation of the bilge pump. The float switch functions to start and stop the pump according to the level of fluid contained in the bilge, as indicated by the float. The switch is electrically connected to the bilge pump such that as fluid accumulates in the bilge, the float floats upward with the fluid level until the switch is triggered to initiate operation of the pump, and begin pumping the fluid overboard. Similarly, as the fluid is pumped overboard and the fluid level in the bilge falls, the float floats down with the fluid level, where it again triggers the switch to terminate operation of the pump.

Due to the location of the bilge in the bottom of a vessel, hazardous waste, such as oil, gasoline, diesel fuel, grease, fuel, transmission fluid etc., are also subject to collection in the bilge along with non-hazardous fluids such as rainwater, air conditioner condensate, and water brought onto the vessel due to swimming and/or other activities. These hazardous waste fluids, if not removed prior to operation of the bilge pump, are discharged overboard with the other fluids, thereby polluting the surrounding waterway. Additionally, under current laws, the discharge of such hazardous waste fluids into a waterway is a source of liability for owners and operators of marine vessels. Therefore, a need exists in the art for preventing the discharge, as well as removal of, hazardous fluids from marine vessels.

SUMMARY OF THE INVENTION

In view of the foregoing, an object of the present invention is to provide an improved method and apparatus for preventing the discharge of hazardous fluids into a waterway. A related object of the present invention is to provide an improved method and apparatus for preventing or reducing the discharge of such hazardous fluids from their source or point of origination, namely a bilge area of a marine vessel. Another object of the present invention is to provide a method and apparatus for improved removal of hazardous fluids from a bilge area of a marine vessel. A related object of the present invention is to minimize or eliminate the introduction of hazardous fluids to a bilge pump in a marine vessel. Another object of the present invention is to provide an apparatus that improves remediation of hazardous fluids in the bilge area of a marine vessel.

In the context of the present invention, the term "marine vessel" includes any structure having a collection area, e.g., a bilge, for disposal of fluids into a waterway, with some examples including without limitation, boats, ships, offshore drilling platforms and the like. Also, in the context of the present invention, hazardous waste fluids are referred to herein as petrochemicals and include at least hydrocarbon compounds such as crude oil, diesel, gasoline, transmission oil, gear oil and the like. Furthermore, it will be appreciated that due to the density difference and buoyancy forces between petrochemicals and water, petrochemicals float on the surface of water and are most notably apparent by the appearance of a shiny film.

One or more of the above objectives and additional advantages may be realized by a first aspect of the present invention, which provides an absorber for removing petrochemicals from a fluid in a bilge area of a marine vessel. The absorber includes a frame having a geometric shape that defines an interior space or area within the absorber. The absorber further includes a petrochemical absorbent material configured in the geometric shape of the frame and connectable to the frame to form the absorber. Preferably, such material is hydrophobic, such that it is impervious to water and substantially only absorbs petrochemicals or other potentially hazardous fluids.

Various refinements exist of the features noted in relation to the subject first aspect of the present invention. Further features may also be incorporated in the subject first aspect as well. These refinements and additional features may exist individually or in any combination. For instance, according to one embodiment of the absorber, the interior area may be sized and shaped for positioning around a bilge pump of a marine vessel. In this regard, the absorber may operate to absorb petrochemicals from the fluid in the bilge as well as to isolate an inlet(s) of the bilge pump from receipt of petrochemicals. In the latter case, the absorber may be floatable on the fluid such that as the fluid is pumped from the bilge, the absorber lowers with the fluid to circumscribe the bilge pump, and specifically, the bilge pump inlet(s). In this case, the exact geometric shape of the frame is only limited by the requirement of defining an interior space/area sized and shaped to accommodate a bilge pump. Thus, the frame may be a rectangular, square, circular, ovular etc. shape as a matter of design choice. Additionally, the interior space/area defined by the frame may be fully or only partially enclosed.

In one arrangement, the absorber may include a cover material connected around the frame and absorbent material. The cover material may be a petrochemical absorbent material or may be a material that allows fluid and petrochemicals to pass through to the enclosed absorbent material. In another arrangement, the absorber may include an indicator to provide information to a user regarding the level of saturation of the absorbent material and thus the need for replacement of the same.

One or more of the above objectives and additional advantages may also be realized by a second aspect of the present invention, which provides an apparatus for positioning a petrochemical absorber in a bilge area of a marine vessel. The apparatus includes a locator mountable in the bilge area in vertical relation to a fluid therein and a channel defined along at least a portion of the locator for slidable receipt of the absorber. The absorber is movable along the channel as a function of a fluid level in the bilge area.

Various refinements exist of the features noted in relation to the subject second aspect of the present invention. Further features may also be incorporated in the subject second aspect as well. These refinements and additional features may exist individually or in any combination. For instance, the locator may be positioned in the bilge area in a generally upstanding relation to the fluid therein to define a predetermined path of travel for the absorber. In another instance, the locator may also laterally restrain the absorber during movement through the absorber's predetermined path of travel as determined by the locator.

According to one embodiment, the locator includes a single housing defining a channel from a lower portion connected to a base member to an upper portion proximate a maximum fluid level of a bilge area. According to another embodiment, the locator may include a pair of substantially parallel housings defining a first and second channel respectively from a lower portion connected to a base to an upper portion proximate a maximum fluid level of a bilge area. In the first embodiment, the locator may be configured for use with an enclosed or substantially enclosed absorber. In the latter embodiment, the locator may be configured for use with a semi-enclosed absorber such that a first end is slidably received in one of the channels and a second end is slidably received in the other one of the channels. According to this characterization, the locator may further include a sealing wall disposed between the two housings. The sealing wall may further include a passage for a discharge outlet conduit of a bilge pump. In this manner, the absorber is movable along the locator between lower and upper portions as a function of the fluid level.

In either of the above embodiments, the locator is preferably positioned proximate a bilge pump to absorb petrochemicals from the surrounding bilge fluid and substantially prevent entry of petrochemicals into an inlet(s) of the bilge pump as the absorber is moved along the locator, as a function of the bilge fluid level.

One or more of the above objectives and additional advantages may also be realized by a third aspect of the present invention, which provides an apparatus for removal of petrochemicals from fluid in a bilge area of a marine vessel. The apparatus includes an absorber for absorbing petrochemicals and a locator for locating the absorber in the bilge area of a marine vessel. The locator may further include the channel defined along at least a portion of the locator for slidable receipt of the absorber, wherein the absorber is movable along the channel as a function of the fluid level in the bilge area.

Various refinements exist of the features noted in relation to the subject third aspect of the present invention. Further features may also be incorporated in the subject third aspect as well. These refinements and additional features may exist individually or in any combination. For instance, the locator and absorber may be various combinations of the above set forth embodiments of locators and absorbers according to the present invention.

One or more of the above objectives and additional advantages may also be realized by a fourth aspect of the present invention, which provides a method of removing petrochemicals from a fluid in a bilge of a marine vessel. The method comprises positioning a locator in the bilge of the marine vessel in an upstanding relation to a bilge fluid level and moving a petrochemical absorber along the locator using the fluid level. The method further includes absorbing petrochemicals from the fluid in the bilge area using the absorber.

Various refinements exist of the features noted in relation to the subject fourth aspect of the present invention. Further features may also be incorporated in the subject fourth aspect as well. These refinements and additional features may exist individually or in any combination. For instance, the locator may be positioned proximate a bilge pump and the positioning step may include locating the bilge pump in an interior area of the absorber using the locator. Similarly, the absorbing step may include contacting petrochemicals with the absorber and absorbing the petrochemicals with a wicking action as the absorber is moved along locator.

One or more of the above objectives and additional advantages may also be realized by a fifth aspect of the present invention, which provides a method of removing petrochemicals from a fluid in a bilge of a marine vessel. The method comprises locating an absorber in a predetermined lateral position within the bilge, moving the absorber up and down within the bilge as a function of a fluid level, maintaining the lateral position of the absorber as the absorber moves up and down and absorbing petrochemicals from the fluid.

Various refinements exist of the features noted in relation to the subject fifth aspect of the present invention. Further features may also be incorporated in the subject fifth aspect of the present invention as well. These refinements and additional features may exist individually or in any combination. Furthermore, additional aspects, advantages and applications of the present invention will be apparent to those skilled in the art upon consideration of the following.

According to another aspect of the present invention, a bilge pump is provided that is adapted for use with a floating absorber that isolates an inlet(s) of the pump from petrochemicals. The bilge pump is adapted to permit a floating absorber to move up and down along its outside surface. In this regard, the bilge pump acts as a locator that limits the lateral position of the absorber within a bilge of a marine vessel. The bilge pump includes a housing that defines an internal volume. More specifically, the housing includes a base, a sidewall and a top surface, where the sidewall extends between the base and top surface. The base may be positioned relative to a bilge surface such that the sidewall is at least partially upright relative to the fluid in the bulge. At least one opening within the housing is disposed proximate to the base to allow bilge fluid to enter the internal volume. A fluid outlet extends out of the top surface of the housing. For instance, the fluid outlet may vertically exit the top surface. Finally, the pump includes a fluid pumping device is at least partially disposed within the internal volume and which is operative to pump fluid from within the internal volume through the fluid outlet. As will be appreciated, use of a top surface outlet allows for a floating absorber to move along the outside surface of the pump housing free of obstruction that may be caused by a fluid outlet exiting the housing through the sidewall.

In one arrangement, the bilge pump further includes a floating petrochemical absorber that is movable with a fluid level in a bilge. The petrochemical absorber may define a closed geometric shape having an internal area. In such an arrangement, the housing may be disposable within the internal area of the absorber. In this regard, the outside surface of the pump housing may define a travel path of the absorber as well as limit lateral movement of the absorber. In order to limit upward movement of the absorber, the outside surface of the bilge pump may further include a stop that extends laterally outward for restraining upward movement of the absorber. For instance, an outside surface of the housing may include a lip that extends around a portion or all of the pump housing.

In one arrangement, utilizing the floating absorber, the thickness of the absorber is greater than a maximum height of the fluid inlet as measured from the base of the pump housing.

In this arrangement, as the floating absorber lowers with a fluid level in a bilge, the absorber may settle on the bilge surface. However, as the thickness of the absorber is greater than the maximum height of the fluid inlet, the absorber may still isolate the fluid inlet from floating petrochemicals.

In order to maintain a floating absorber about an outside surface of the pump housing, the pump may further include a fluid activated switch that maintains a fluid level between the top and bottom surface of the pump housing. Such a fluid activated switch may automatically initiate operation of the pumping device when a fluid reaches a first level (e.g., near the top of the housing) and may automatically terminate operation of the pumping device when the fluid recedes to a second lower level. In one arrangement, such a fluid activated switch may be incorporated into the pump. In another arrangement, such a fluid activated switch may include a float switch that is remotely positioned relative to the pump.

In one arrangement, the fluid pumping device includes an electric motor for operating a fluid displacement device. Such a fluid displacement device may include, without limitation, impellers, vanes, (e.g., rotary pumps), diaphragms, pistons (e.g., positive displacement pumps). To provide cooling to the electrical motor, it may be desirable for at least a portion of an outside surface of the motor to be disposed within the fluid flow path between the inlet and the vertical discharge. In a further arrangement, it may be desirable to completely immerse the outside surface of the motor within the fluid flow path between the inlet and vertical discharge.

In one arrangement, the housing comprises a body member and a base member that is removably connectable to the body member. In such an arrangement, the base member may include the base and one or more fluid inlets and the body member may house the fluid pumping device. In such an arrangement, the base member may be adapted for fixed positioning relative to a surface in the bilge. Such an arrangement may allow for selectively exchanging the body member and pumping device for maintenance purposes. In one arrangement, the base member may further include a plurality of fluid inlets that define a strainer for impeding entry of debris into the internal volume of the housing.

According to another aspect of the present invention, a bilge pump is provided for discharging fluid from a bilge substantially free of petrochemicals. The pump includes a pump housing having a base for positioning relative to bilge surface where the base defines a horizontal reference plane. At least one inlet opening disposed proximate to the base of the pump housing allows fluid to enter the pump housing. A fluid outlet extends out of pump housing at a location above the inlet as measured from the base. A fluid pumping device that is at least partially disposed within the pump housing is operative to pump fluid within the pump housing through the fluid outlet. Finally, the device includes a petrochemical absorber that is disposed around at least a portion of an outside surface of the pump housing. This absorber is operative to move along outside source of the pump housing in correspondence with the fluid level within a bilge. In this arrangement, the outside surface of the pump housing defines a pathway for the petrochemical absorber.

In one arrangement, the petrochemical absorber forms a closed geometric shape having an internal area. In this arrangement, the petrochemical absorber is disposed around the entirety of the outside surface of the housing. To facilitate movement of the absorber with the fluid level, an outside surface of the pump housing may be substantially vertical or tapered between the base and a first predetermined height above the base. In this regard, the outside surface may permit the absorber to move between, for example, a low fluid level and a high fluid level within the bilge without the floating absorber becoming caught on an outside surface of the pump housing.

In another arrangement, the fluid outlet is at least 4 inches above the height of the inlet as measured from the base. In a further arrangement, the fluid outlet is at least 5 inches above the height of the inlets as measured from the base. In these arrangements, the fluid outlet may discharge through a sidewall surface (e.g. horizontally) of the housing while still permitting the outside surface of the housing to define a pathway for the absorber between, for example, a high fluid level in a low fluid level within the bilge.

According to another aspect of the present invention, a bilge pump is provided for removing fluid from a bilge of a marine vessel. The bilge pump includes a pump housing having a sidewall that defines an internal volume and a base for disposition relative to bilge surface. The housing includes at least one inlet opening to allow fluid into the housing and a fluid outlet extending out of the housing and location above the inlet. The device further includes a petrochemical absorber that defines a closed geometric shape having an internal area. The pump housing is disposed within the internal area of the absorber. A maximum horizontal cross-dimension of the pump housing sidewall between the base and a first sidewall height above the base is less than a maximum cross-dimension of the internal area. Stated otherwise, the inside periphery of the internal area is greater than the outside periphery of the housing sidewall between the base and the first sidewall height. In this regard, at least between the base and the first sidewall height on the pump housing, the petrochemical absorber is able to move relative to outside surface of the pump housing in correspondence with the fluid level of a bilge.

Generally, the outside surface of the pump housing contains no protrusions that are in a cross-dimension greater than an inside cross-dimension of the internal area of the petrochemical absorber. For instance, the outside surface may be substantially perpendicular relative to the base to facilitate movement of the absorber. In a further arrangement, the maximum horizontal cross dimension of the pump housing is less than the minimum cross dimension of the internal area. For instance, a circular pump housing may have an outside diameter that is less than an inside diameter of a petrochemical absorber having a circular interior area.

The first sidewall height is generally spaced from the base to permit the absorber to move between a maximum fluid level of a bilge and minimum fluid level. For instance, the first sidewall height may be at least 4 or 5 inches above the base. Further, to prevent movement of the absorber beyond the first vertical location, a stop may be interconnected to an outside surface of the sidewall at the first sidewall height. In this regard, a maximum horizontal cross-dimension at the first sidewall height may be greater than a corresponding cross-dimension of the internal area of the absorber. For instance, such a stop may be formed by the fluid outlet exiting the sidewall at the first sidewall height. Alternatively, a lip may be formed around all or a portion of the outside surface of the sidewall.

According to another aspect, a method is provided for use in removing fluid from a bilge of a marine vessel. The method includes positioning a bilge pump within a bilge of a marine vessel and disposing a petrochemical absorber about at least a portion of a housing of the bilge pump. As will be appreciated, the petrochemical absorber may be utilized to isolate an inlet of the bilge pump from petrochemicals floating on the surface of fluid within the bilge. Further, the petrochemical absorber may be moved along the outside surface of the pump housing with a fluid level of the bilge. More specifically, the petrochemical absorber may be moved along a pathway defined by the pump housing between a minimum vertical position (e.g., a bilge surface supporting the pump) and a maximum vertical position. The method further includes operating a fluid displacement device that is disposed within the pump housing to pump fluid out of the pump housing at a location above the maximum vertical position of the petrochemical absorber.

The method may further include disposing the petrochemical absorber about an entirety of the pump housing. For instance, a petrochemical absorber defining a closed geometric shape having an internal area (e.g., annular) may be disposed around the housing of the bilge pump. In this regard, the pump housing may be utilized to limit the lateral position of the absorber within the bilge. Further, in any arrangement the pump housing may be utilized to restrain vertical movement of the absorber at the maximum vertical position.

In one arrangement, operation of the fluid displacement device includes pumping fluid vertically out of the pump housing at a location above the maximum vertical position of the petrochemical absorber. In an alternate arrangement, the fluid displacement device is operative to pump fluid horizontally out of the pump housing at a location above the maximum vertical position of the petrochemical absorber. What is important is that the outside surface of the pump housing is substantially free up protrusions that would limit movement of the petrochemical absorber along the pathway defined by the pump housing between the minimum and maximum vertical positions.

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application(s) or use(s) of the present invention.

Figure 1:
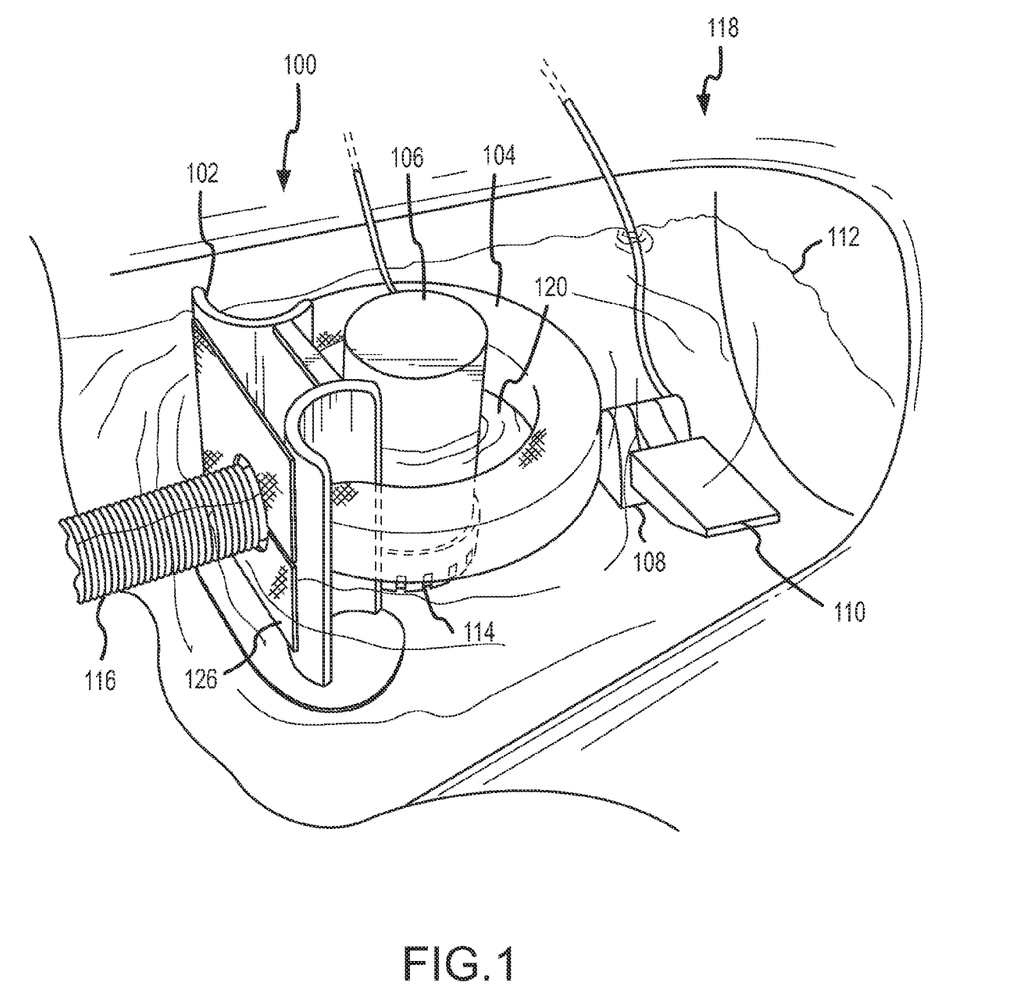
FIG. 1 illustrates a water pollution prevention apparatus installed in a bilge of a marine vessel.

As shown in FIG. 1, a water pollution prevention apparatus 100 includes a locator 102 and an absorber 104. The water pollution prevention apparatus 100 is designed for mounting in a bilge 118 of a marine vessel. While the apparatus 100 may be mounted at various locations within the bilge 118, the water pollution prevention apparatus 100 is most advantageous when positioned proximate a bilge pump 106, such that an interior space 120, of the absorber 104 is positionable around the pump 106. Alternatively, however, it will be appreciated from the following description that other mounting locations are possible and anticipated to achieve the objects and advantages of the present invention, namely preventing the discharge of petrochemicals from marine vessels and removal of the same from bilge areas, e.g., bilge 118.

By way of background, the bilge pump 106 may be any one of numerous types of bilge pump systems utilized in marine vessels. For purposes of illustration, however, the bilge pump 106 is shown on FIG. 1 to include components that are typically included on bilge pump systems. In this regard, the bilge pump 106 includes fluid inlets 114 disposed around its base, as well as a fluid outlet conduit 116, connected to a location external to the bilge 118. During operation of the pump 106, the fluid 112 is drawn into the fluid inlets 114 from the bilge 118 and discharged overboard of the vessel through the outlet conduit 116. It will be appreciated that in a typical bilge pump system, such as bilge pump system 106, it is desirable to locate the fluid inlets 114 at the lowest practical point within the bilge 118 to facilitate removal of a maximum amount of fluid 112 during operation of the pump 106.

An automatic float switch 108, that includes a float 110, controls operation of the pump 106. The float switch 108 functions to start and stop the pump 106 according to a level of fluid 112 contained within the bilge 118, as indicated by the float 110. The float switch 108 is electrically connected to the pump 106 such that as the fluid 112 accumulates in the bilge 118, the float 110 floats upward with the fluid 112 until the float switch 108 is triggered to initiate operation of the pump 106 and begin pumping the fluid 112 overboard; most commonly through a discharge tube or hose, e.g., conduit 116, between the bilge pump discharge port and an exit orifice located external to the vessel. Similarly, as the fluid 112 is pumped overboard and the level of fluid 112 falls, the float 110 floats down with the level of fluid 112 and again triggers the float switch 108 to terminate operation of the pump 106.

The locator 102, of the water pollution prevention apparatus 100, operates to position the absorber 104 within the bilge 118 as the level of fluid 112 moves up and down between pumping cycles. Specifically, as the fluid 112 moves up within the bilge 118 the absorber 104 is floated up along the locator 102 with the fluid 112. Likewise as the level of fluid 112 drops, the absorber 104 moves down the locator 102 with the level of fluid 112. Thus, the locator 102 defines a predetermined path of travel for the absorber 104 as a function of the level of fluid 112 in the bilge 118.

The locator 102 also maintains lateral positioning of the absorber 104 within the bilge 118. Preferably, such lateral positioning locates the absorber 104 around the bilge pump 106, as the level of fluid 112 moves up and down between pumping cycles. In this regard, the absorber 104 includes the interior area 120, which is substantially free from petrochemicals. Further, the absorber 104 preferably comprises a material that absorbs petrochemicals from the fluid 112, such that petrochemicals are unable to pass under or through the absorber 104. This in turn maintains the area 120 substantially free from petrochemicals; thereby isolating the inlets 114 of the bilge pump 106 from receipt of petrochemicals. According to this characterization, as the level of fluid 112 drops in the bilge 118, the absorber 104 and interior area 120, are moved down along the locator 102 to a position where the absorber 104 circumscribes the fluid inlets 114 of the pump 106. This in turn isolates the inlets 114 during operation of the pump 106 from receipt of petrochemicals, thereby preventing their discharge into the adjacent waterway(s).

Furthermore, where petrochemicals are introduced into the area 120, such as by splashing over the top of the absorber 104, the petrochemicals should be absorbed into the absorber 104 prior to reaching the inlets 114. This follows from the inherent operational characteristics of the bilge pump 106, in combination with the design and operational characteristics of the present water pollution prevention apparatus 100. For instance, since the pump 106 only operates when the fluid 112 reaches a predetermined height or level, if splash-over occurs with less than the predetermined fluid level, the pump 106 is non-operational and the absorber 104 has time to absorb any splashed over petrochemicals in the area 120 prior to operation of the pump 106. If on the other hand, the fluid level is at or close to the predetermined level, e.g., where the pump 106 is about to be operated, the absorber 104 should still absorb substantially all of the petrochemicals prior to the fluid level dropping to a point where petrochemicals on the surface can be drawn into the inlets 114. In this regard, it is anticipated that due to the relatively small size of the area 120, relative to the bilge 118, substantially all, if not all, of any petrochemicals introduced in the area 120 will be quickly absorbed by the absorber 104.

It should also be noted, that the absorber 104 may be constructed in a variety of predetermined thicknesses, as a function of the vessel for which it is to be used. For instance, a thicker absorber 104 increases the availability of absorbent material for absorbing petrochemicals from the fluid 112. Furthermore, a thicker absorber 104 minimizes the amount of splash-over of fluid 112 into the area 120, which as noted, may briefly introduce petrochemicals 300 into the area 120. Thus, by utilizing a thicker absorber 104 in vessels that are more susceptible to turbulent conditions, the introduction of petrochemicals via splash-over into the area 120 may be further minimized.

Figure 2:
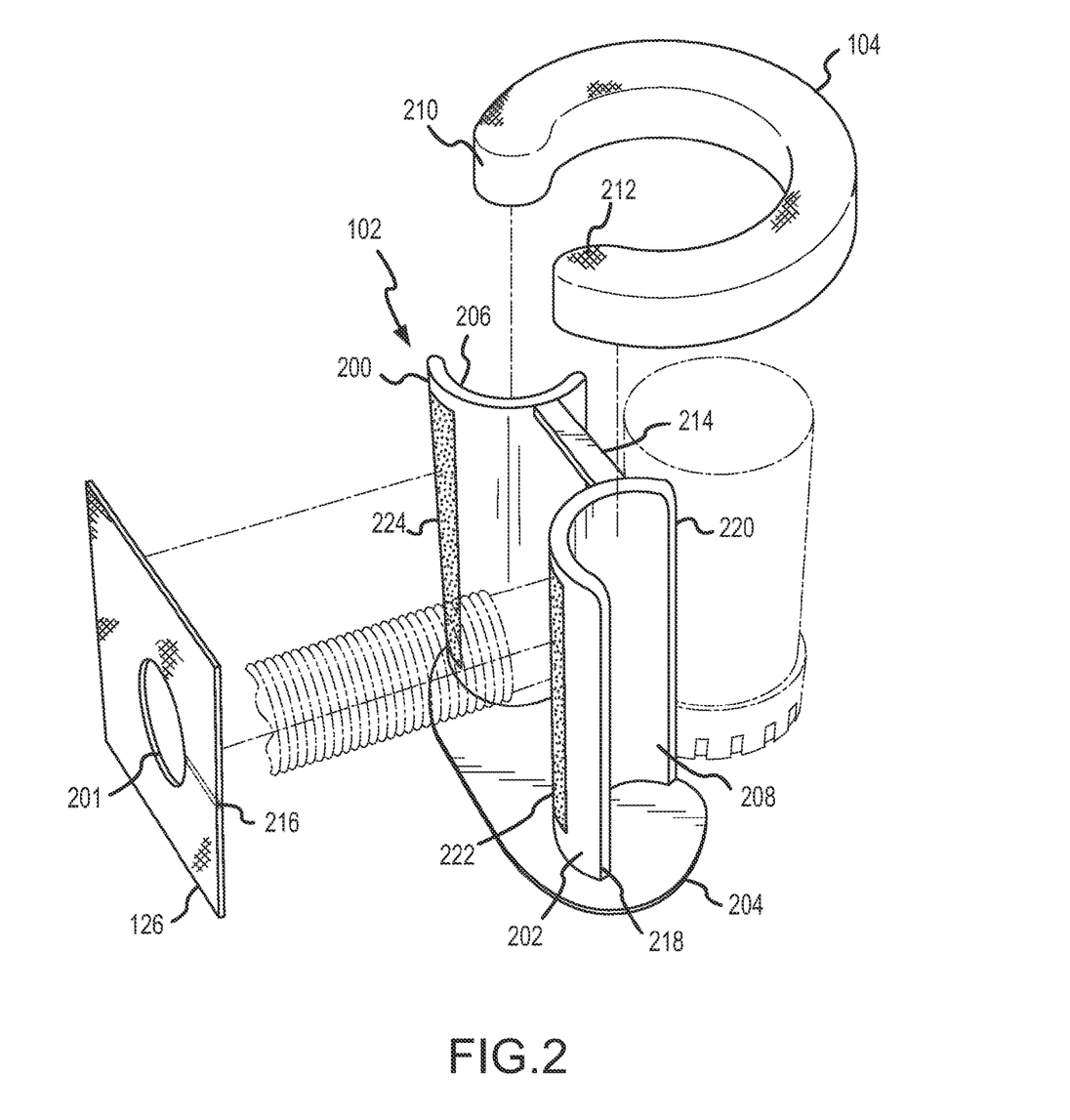
FIG. 2 illustrates an assembly view of the water pollution prevention apparatus of FIG. 1.

Referring to FIG. 2, according to one embodiment of the present water pollution prevention apparatus 100, the locator 102 includes a pair of housings, 200 and 202. The housings, 200 and 202, are connected in parallel relation to each other and perpendicular relation to a base member 204. The base member 204 is in turn, mountable within the bilge 118. The housings, 200 and 202, are generally upstanding relative to the base member 204 such that when the base member 204 is mounted in the bilge 118, the housings, 200 and 202, are in a substantially perpendicular relation to the fluid 112. This in turn controls the direction and facilitates movement of the absorber 104 as a function of the level of fluid 112 in the bilge 118. In addition, while not necessary to the present invention, a brace, such as brace 214, may also be included between the housings, 200 and 202, to provide additional stability to the locator 102.

As will be appreciated, the locator 102 including the housings, 200 and 202, and base 204, may be constructed from numerous types of materials as a matter of design choice. Preferably, however, such materials are chosen as a function of their corrosion resistance and durability in damp environments. Some examples of exemplary materials may include without limitation, plastics, fiberglass, and/or stainless steel.

The housings, 200 and 202, each include or define a locator channel, 206 and 208, respectively. The locator channels, 206 and 208, function as an interface for the slidable connection of a first end 210 and second end 212 of the absorber 104. In this regard, the housings, 200 and 202, are positioned on the base member 204 in a spaced relation such that the ends, 210 and 212, are insertable into the top of the channels, 206 and 208, to provide a slidable connection therebetween. Advantageously, such a connection provides a slidable engagement between the locator 102 and the absorber 104, as well as a detachable connection therebetween, e.g., the absorber 104 may be removed by sliding the ends, 210 and 212, out of the top of the channels, 206 and 208. This in turn facilitates simple replacement of the absorber 104 in the event it becomes worn or saturated with petrochemicals. Furthermore, as illustrated on FIG. 2, such positioning of the housings, 200 and 202, may also include a slight inward rotation of the channels, 206 and 208, relative to the absorber 104. As will be appreciated, the inward rotation minimizes the opening between the ends, 210 and 212, of the absorber 104 and maximizes the amount of absorption capability for a given absorber 104.

The absorber 104 is maintained in a substantially perpendicular orientation relative to the locator 102 through floatation on the fluid 112. In this regard, the absorber 104 is free to move with the level of fluid 112 between an upper portion 220 and lower portion 218 of the locator 102. In other words, the locator 102 operates as a vertical guide for the absorber 104, which is floated up and down within the bilge 118 as a function of the amount of fluid 112 contained therein. It will be appreciated in this regard, that the dimensions of the housings, 200 and 202, are a function of the maximum level of fluid 112 that is permitted in a given bilge, e.g., 118, as well as the size of a given bilge pump, e.g., 106. In other words, the housings, 200 and 202, should be of sufficient height to accommodate movement of the absorber 104 between a maximum fluid level and a minimum fluid level. Further, the housings, 200 and 202 should be of sufficient size to accommodate the size of a given absorber 104, which in turn is a function of bilge pump size and desired amount of absorption material. Thus, the housings, 200 and 202, may be constructed in different dimensions, as a matter of design choice, to accommodate different vessel sizes, e.g., larger vessels having the ability to accommodate more fluid 112 within their bilges and having larger pumps than smaller vessels.

The locator 102 may also include a sealing wall 126 covering the backside of the housings, 200 and 202. The sealing wall 126 includes an aperture 201 appropriately sized to accommodate the outlet conduit 116 of the bilge pump 106. In one example, the sealing wall 126 may be detachably connected to the housings, 200 and 202, to facilitate installation of the water pollution prevention apparatus 100. Those skilled in the art will appreciate numerous methods that may be utilized as a matter of design choice to provide the detachable connection of the sealing wall 126; with one example being, Velcro strips 222 and 224. The sealing wall 126 may also include a slot 216 to permit the sealing wall 126 to be snapped over the outlet conduit 116 during connection. In other words, the opposing sides of the slot 216 may be bent in opposite directions to provide a larger opening for the conduit 116 to pass through the slot 216 during connection. It should be noted that, according to this embodiment, the sealing wall 126 also operates to enclose the interior area 120 of the absorber 104 to prevent entry of petrochemicals. Thus, in this case, petrochemicals are prevented from entering the area 120, as they are unable to pass through the sealing wall 126, as well as under, or through the absorber 104.

As with the locator 102, base 204, and housings, 200 and 202, the sealing wall may be constructed from numerous types of materials as a matter of design choice. Preferably, however, such materials are chosen as a function of their corrosion resistance and durability in damp environments. Some examples of exemplary materials may include without limitation, plastics, fiberglass, and/or stainless steel.

In another example of the present water pollution prevention apparatus 100, the sealing wall may be constructed from or covered with a material that absorbs petrochemicals 300. Advantageously, this increases the absorption and removal capacity of a given apparatus 100. As discussed further below, some examples of such materials include those having a cellular material sufficiently open to allow the fluid 112 to pass freely and yet remain oil wet (oleophilic) when contacted by an oil-water mixture, e.g., petrochemicals 300.

Figure 3:
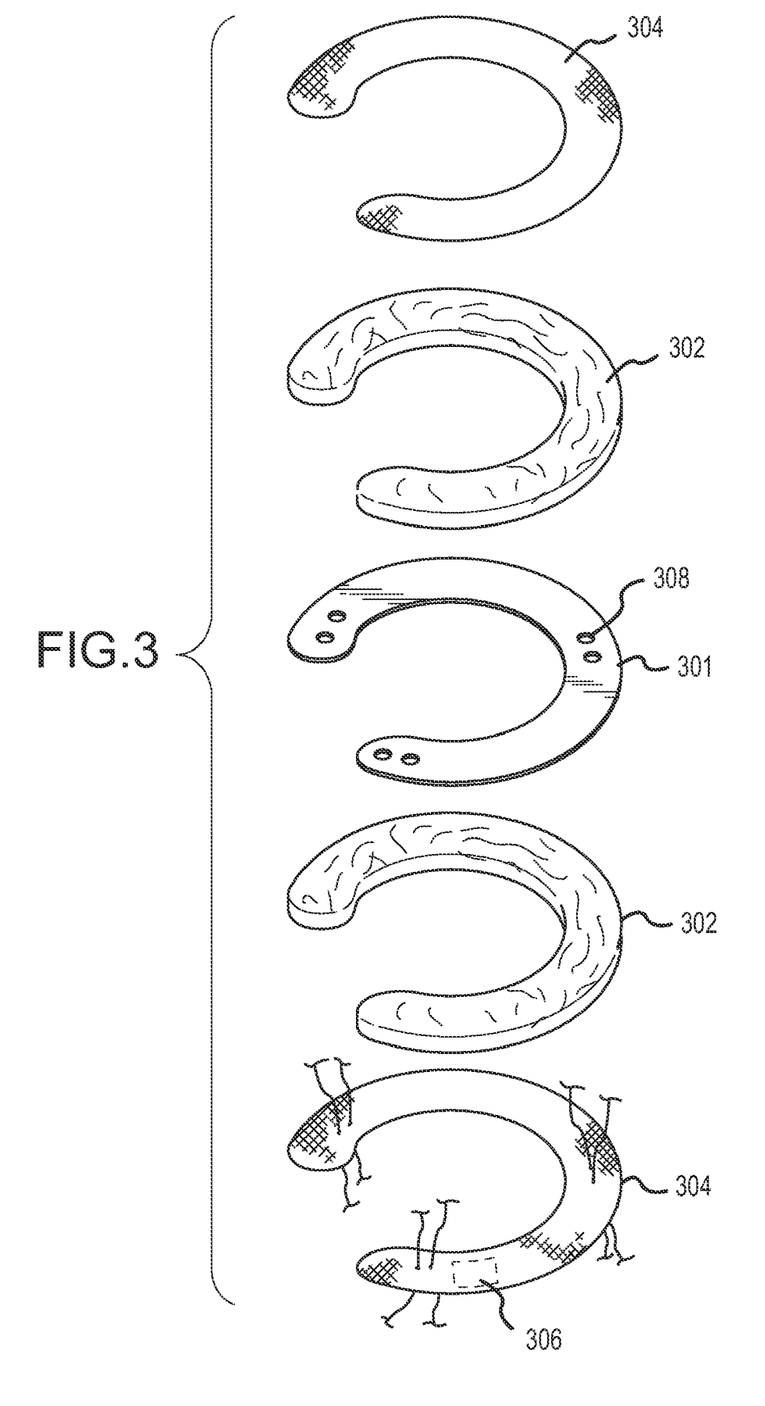
FIG. 3 illustrates an assembly view of an absorber for the water pollution prevention apparatus of FIG. 1.

FIG. 3 illustrates an assembly view of the absorber 104 according to the present invention. The absorber 104 includes a support member, e.g., a frame 301, a first material 302, and a cover material 304. The frame 301 is designed to provide support and rigidity to the absorber 104 to facilitate movement along the locator 102. Specifically, the frame 301 reduces deformation of the absorber 104 as it absorbs petrochemicals, thereby reducing binding of the ends, 210 and 212, within the locator channels, 206 and 208, respectively. This is especially advantageous as the absorber 104 becomes saturated with petrochemicals.

Taking into consideration the intended environment of use, it will be appreciated that the frame 301 may be constructed from numerous materials as a matter of design choice. Some examples of such materials include without limitation plastics and fiberglass. Furthermore, the frame 301 may be a highly porous polymer structure known as fully reticulated open-cell foam, such as polyurethane. Advantageously, such a material provides rigidity as well as providing an effective petrochemical collecting action to improve efficiency of the absorber 104. Additionally, the hydrophobic character of polyurethane foam coupled with its lightweight and relatively high specific gravity, normally in the range of 1.00 and 1.20, provides an ideal material for constructing a buoyant absorber 104 that is well adapted to serve as a floating petrochemical collection structure for the water pollution prevention apparatus 100.

While the frame 301 is shown in a semi-circular configuration on FIG. 3, it will be appreciated the frame 301 may be any geometric shape that includes an interior space, e.g., 120, sized and shaped to accommodate a bilge pump, such as pump 106. Thus, the frame 301 may be a variety of shapes including without limitation, ovular, square, rectangular, triangular, etc. each of which may be a fully enclosed or semi-enclosed structure.

The material 302 may be any material that absorbs petrochemicals 300. The material 302 may be a single piece of material or multiple pieces of material, as illustrated on FIG. 3, that are formed in the shape of the frame 301, e.g., in the illustrated embodiment, a semi-circular shape. Some examples of petrochemical absorbent materials suitable for use include those having a cellular material sufficiently open to allow the fluid 112 to pass freely and yet remain oil wet (oleophilic) when contacted by an oil-water mixture. As used herein, the term "cellular material" is intended to denote a variety of materials, including open-cell foams or sponges, and also fibrous mats, or pads, fabricated from such substances as asbestos fibers, hay, straw, cotton, synthetic fibers, such as synthetic rubber and the like. Some further examples include without limitation, generic polymers, such as polyester, polyethyl, and polyurethane foams.

In another embodiment of the absorber 104, the material 302 may be constructed from cellular materials impregnated with a hydrophobic and oleophilic sealant in a sufficient amount to coat the surfaces of the cells or capillary domains for use in absorbing oil and like pollutants. One example of such a material may be formed by impregnating a sheet of open-celled polyurethane foam with a solution of latex sealant that is inert to water but capable of being swelled in oil.

The cover material 304 may be any material suitable to maintain the petrochemical absorbing material 302 in the predetermined shape of the frame 301 and strong enough to permit physical handling even after a considerable weight of petrochemicals are absorbed. Furthermore, the cover material 304 may itself be adapted to serve as an oil collection material that operates in combination with the material 302 to absorb petrochemicals from the fluid 112. Similarly, the cover material 304 may be a petrochemical resistive material, such as polypropylene or polyethylene mesh or netting material, that permits fluid 112 and petrochemicals to pass freely through the cover material 304 into the material 302. In the first case above (where the cover material 304 is petrochemical absorbent), it may be desirable to sew the cover material 304 around the material 302 and frame 301 as the absorber 104 would be replaced upon saturation with petrochemicals 300. In this case, the frame 301 may also include apertures as exemplified by aperture 308, to facilitate attachment of the cover material 304 and/or the material 302. The apertures 308 also serve to hold the material 302 in the correct position relative to the frame 301.

In the latter case (where the cover material 304 is resistive to petrochemicals), it may be desirable to use a detachable connection such as Velcro to attach the cover material 304 around the material 302 and frame 301. This in turn facilitates replacement of the material 302 upon saturation of the same without the necessity of replacing the frame 301 and cover material 304.

In another embodiment of the absorber 104, the absorber 104 may also include an indicator 306 to provide information to a user regarding the level of saturation of the material 302, and thus, the need to replace the material 302 and/or the absorber 104 in its entirety. In one example, the indicator 306 may be an opening provided in the cover material for viewing of the enclosed material 302. In addition, the indicator opening or window may further include a transparent material sewn into the cover material 304 to protect the enclosed material 302.

Figure 4:
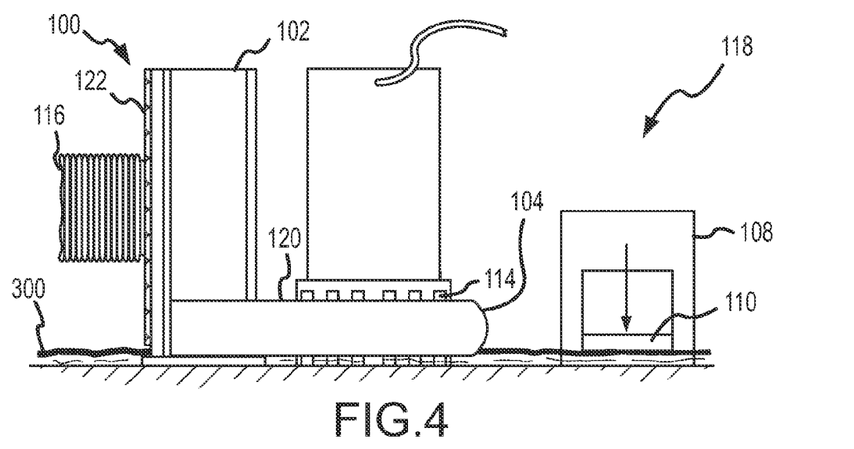
FIGS. 4-6 illustrate an operation protocol for the water pollution prevention apparatus of FIG. 1.
Figure 5:
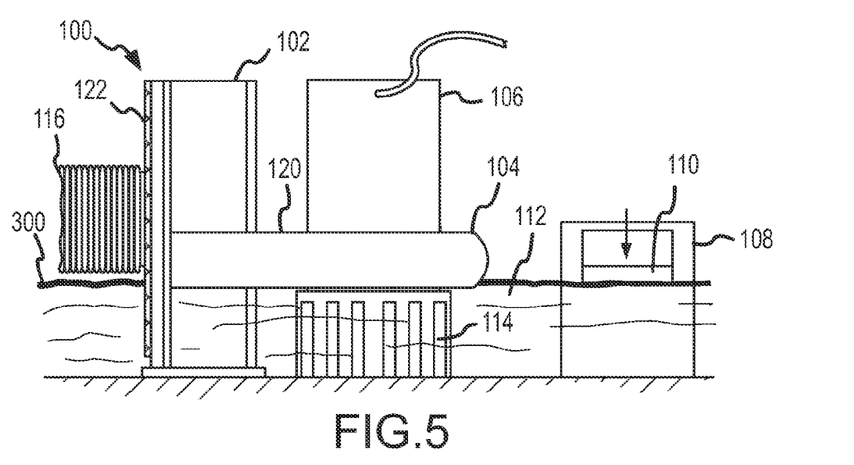
Figure 6:
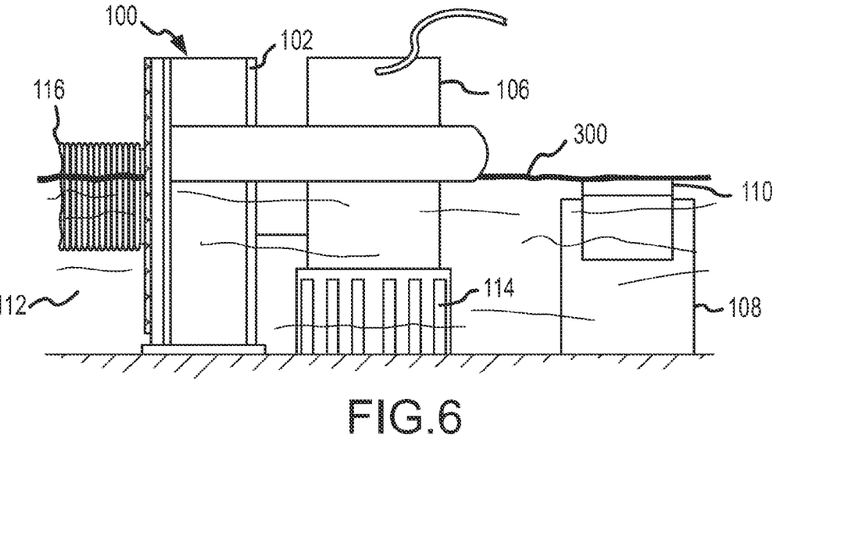

Referring to FIGS. 4-6, one example of an operational protocol for the present water pollution prevention apparatus 100 is provided. Referring first to FIG. 4, there is shown the water pollution prevention apparatus 100 installed in a bilge, such as 118, containing both fluid 112 and petrochemicals 300. The water pollution prevention apparatus 100 is installed in the bilge 118, such that the absorber 104 is positioned around the bilge pump 106. Specifically, the absorber 104 is positioned around the bilge pump 106 such that the fluid inlets 114 are contained within the interior area 120 provided by the absorber 104 and sealing wall 126 when the level of fluid 112 is below the fluid inlets 114, as illustrated on FIG. 4. This in turn isolates the fluid inlets 114 from the petrochemicals 300 minimizing the discharge of the same overboard of a vessel into a surrounding waterway(s). Referring also to FIGS. 5 and 6, during a typical cycle of the bilge pump 106, the level of the fluid 112 will begin to rise as fluid 112 collects in the bilge 118. As the level of the fluid 112 rises, the absorber 104 is floated with the rising fluid 112 upward along the locator 102. When the fluid 112 reaches a maximum fluid level, determined by the design and installation of the bilge pump 106, the float 110 trips a circuit in the float switch 108 to supply a current to the pump 106, thereby beginning operation of the same. As the pump 106 empties the fluid 112 from the bilge 118, the absorber 104 floats downward with the dropping fluid 112. It should be noted, that during operation of the pump 106 only the fluid 112 is pumped through the inlets 114 as the petrochemicals 300 remain on the surface of the fluid 112 away from the fluid inlets 114. Similarly, as the level of fluid 112 falls below the fluid inlets 114, as shown in FIG. 4, the absorber 104 circumscribes the inlets 114 substantially preventing the introduction of petrochemicals 300. In this manner, the water pollution prevention apparatus 100 operates to isolate the bilge pump 106, and particularly the fluid inlets 114, from the introduction of petrochemicals 300. It will be appreciated that FIG. 4 is provided for purpose of illustration, and that subsequent to an initial installation and operation of the pump 106, the float 110 may cease operation of the pump 106 prior to the fluid level falling below the inlets 114. This in turn, prevents cavitation of the pump 106.

Furthermore, the water pollution prevention apparatus 100 also absorbs for later removal, petrochemicals 300 from the fluid 112 and bilge 118. In this regard, as petrochemicals 300 encounter the absorber 104, such as via the fluid 112 sloshing around in the bilge 118, they are absorbed into the absorber 104 by a wicking action. In addition, as noted, the materials of the absorber 104 are preferably hydrophobic such that substantially only the petrochemicals 300 are absorbed and retained in the absorber 104.

Figure 7:
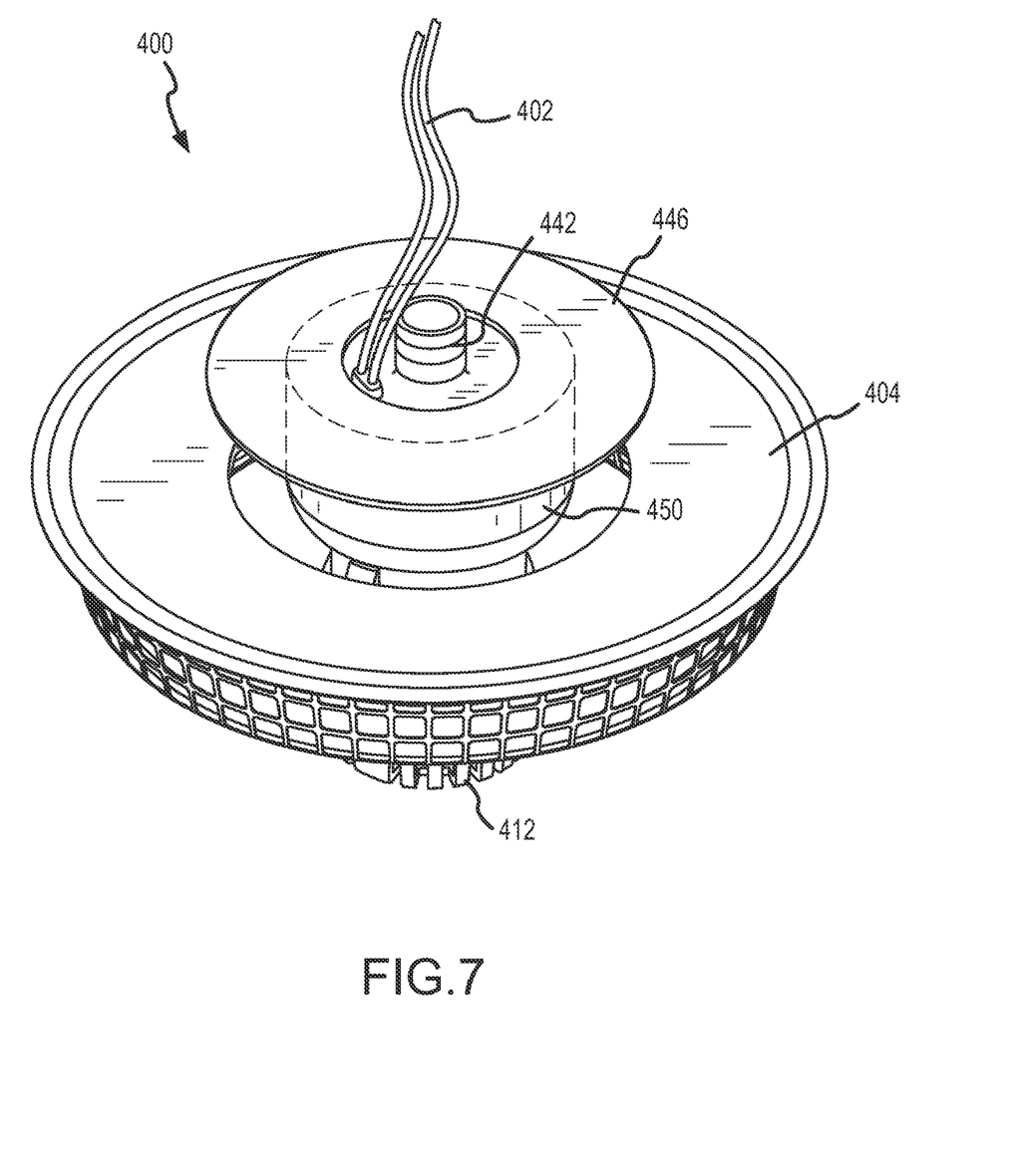
FIG. 7 illustrates another embodiment of a water pollution prevention apparatus for use in a bilge of a marine vessel.

FIG. 7 illustrates another embodiment of a water pollution prevention apparatus 400. In contrast to the apparatus discussed above, the present embodiment does not utilize a separate locator to position a floating petrochemical absorber. Rather, the outside surface of the pump housing 450 is utilized to position a floating petrochemical absorber 404 between a bottom surface of the bilge and an outwardly extending stop or lip 446 that is disposed a vertical distance above the bottom surface. As shown, the pump utilizes a vertical discharge 442 that exits through a top surface of the pump facilitates the use of an outside surface of the housing 450 as a guide for the floating petrochemical absorber 404. That is, the absence of a horizontal discharge extending outward from the housing 450 and which sidewall of the pump housing 450 allows the outside surface of the housing 450 to define a vertical pathway for the absorber 404 while limiting lateral movement of the absorber 404. As above, the floating petrochemical absorber 404 defines an isolated interior area that is substantially free of floating petrochemicals. Accordingly, the petrochemical absorber 404 may prevent the passage of floating petrochemicals to the pump housing 450.

Figure 8:
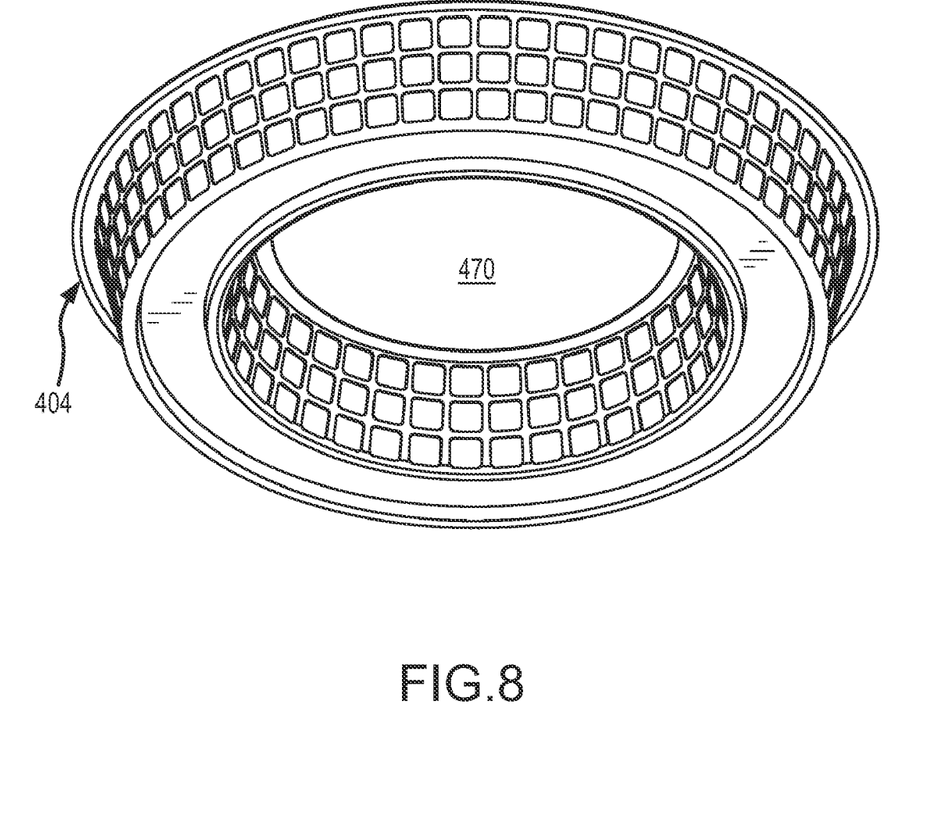
FIG. 8 illustrates a bottom perspective view of an absorber for the water pollution prevention apparatus of FIG. 7.

FIG. 8 shows a bottom perspective view of the absorber 404. As shown, the absorber 404 is formed as a closed geometric shape that defines an enclosed interior area 470. In the embodiment shown, the absorber 404 includes grated inner and outer sidewalls that are interconnected by top and bottom walls. In this arrangement, the absorber 404 defines an interior volume in which petrochemical absorbing material and one or more buoyant members are disposed. The petrochemical absorbing material is operative to absorb floating petrochemicals while the buoyant member(s) provide buoyancy to maintain at least a portion of the absorber at a surface level of fluid within the bilge. The grated inner and outer sidewalls each include a plurality of apertures that allow fluid to enter into the enclosed volume defined by the absorber such that petrochemicals may be absorbed by the petrochemical absorbing material. The internal diameter or cross-dimension of the internal area 470 of the absorber 404 is greater than a maximum horizontal cross-dimension of the pump housing between the bilge surface and the outwardly extending lip 446. As will be appreciated, the horizontal cross-dimension of the lip 446 is sized to prevent passage of the absorber 404. In this regard, the absorber 404 is able to move over the outside surface of the housing (e.g., able to freely float on the surface of bilge fluid) when the fluid level in the bilge (i.e., below the outwardly extending lip 446).

Figure 9:
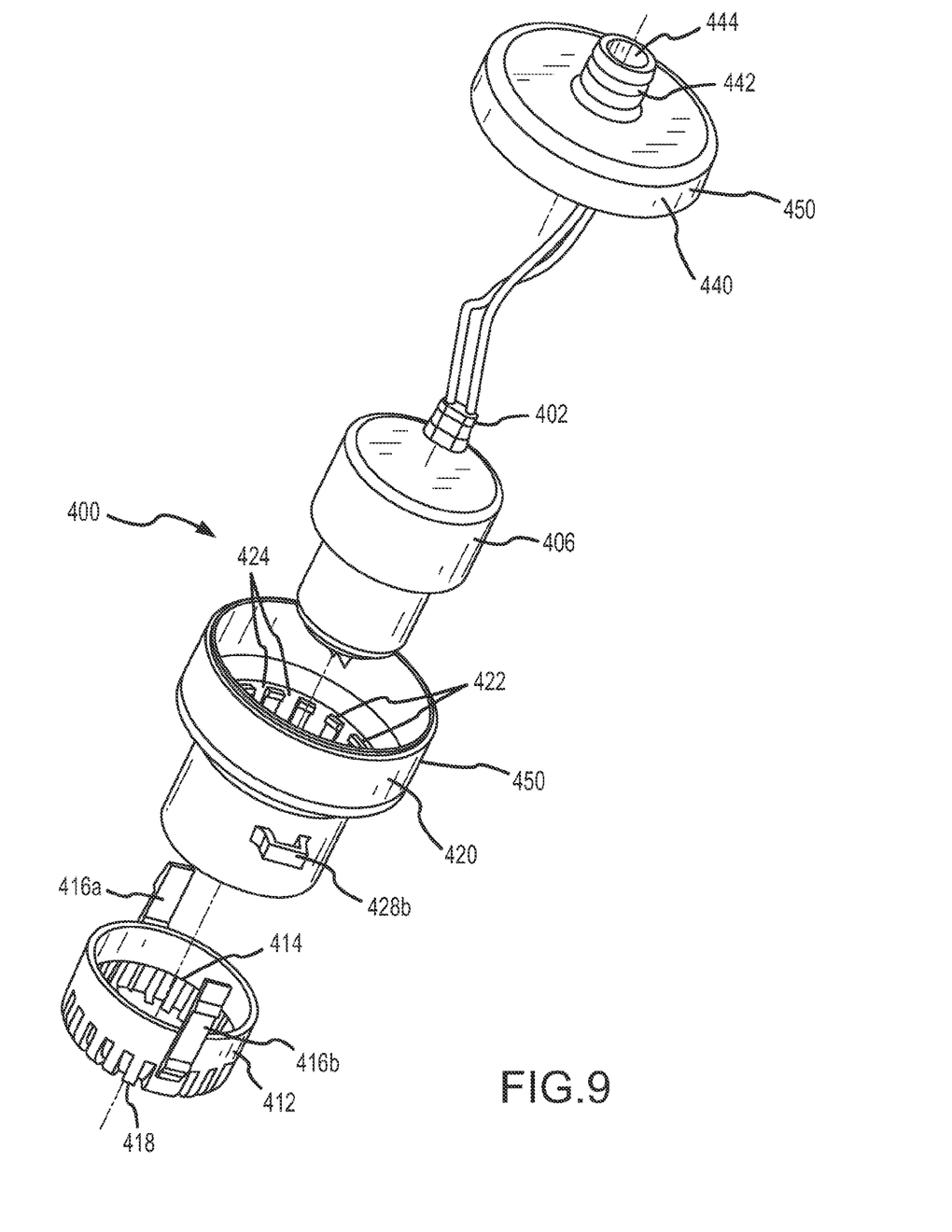
FIG. 9 illustrates an exploded perspective view of the pump of FIG. 7.
Figure 10:
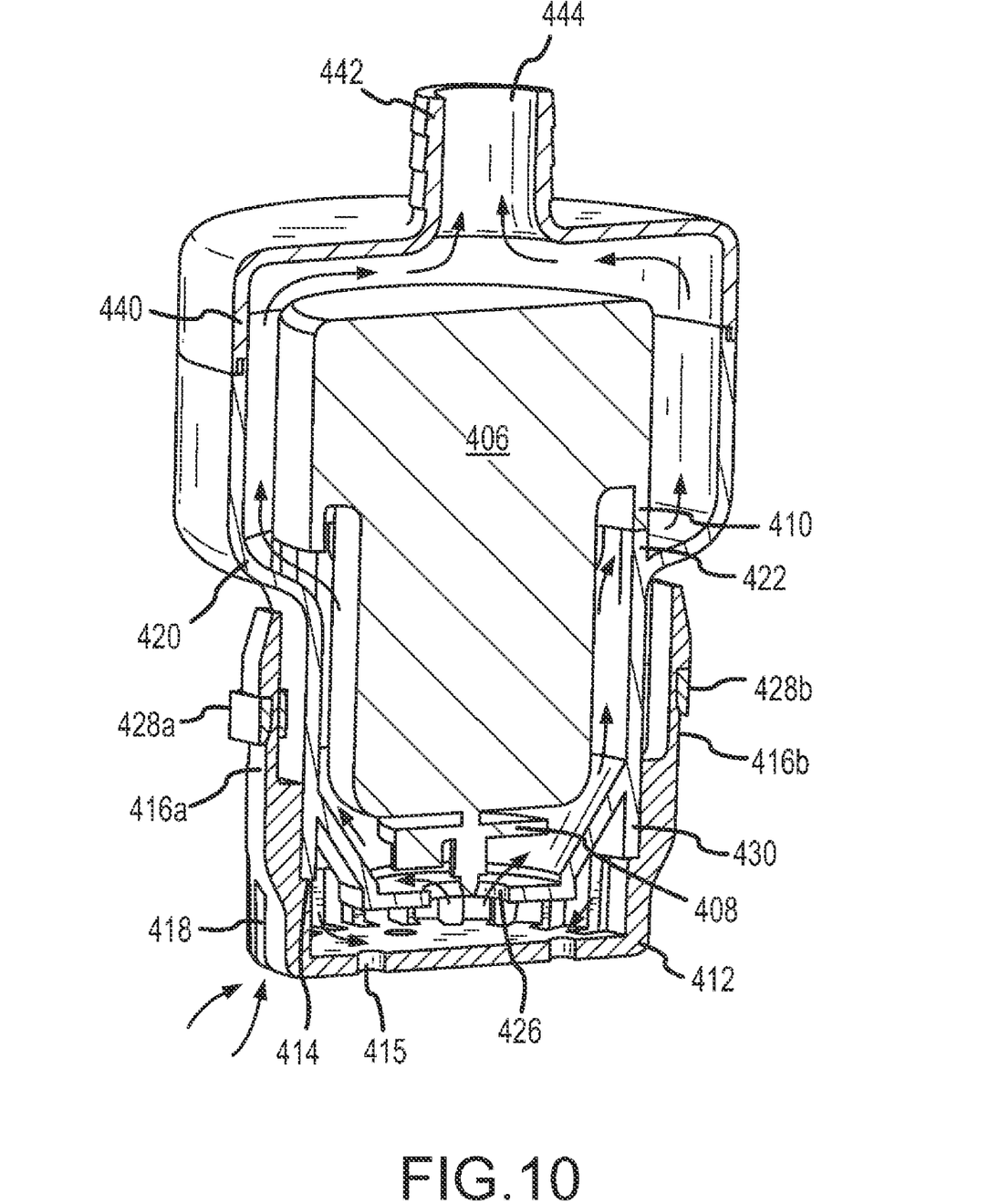
FIG. 10 illustrates a cross-sectional view of the pump of FIG. 7.

As shown in FIGS. 9 and 10, the pump housing 450 is defined by two interconnected members, a main housing member 420 and a cap member 440 and is sized to receive and support a fluid displacement pump 406. Further, the housing 450 is releaseably connectable to a grate member 412 that may be fixedly attached to a bilge surface. In this regard, the grate member 412 defines a base of the apparatus 400. The housing 450 is designed to direct fluid displaced by the fluid pump 406 through a vertical discharge 442 above a maximum vertical position (e.g., as defined by the lip 446) of the absorber 404. Of note, the outside surface of the vertical discharge tube 442 is serrated such that flexible hose may be maintained thereon. However, this is not a requirement.

The cap member 440 attaches to the top edge of the main housing member 420. In this regard, once the pump 406 is disposed within the main housing body 420 cap member 440 may be attached to the main housing member 420 in any appropriate manner. For instance, the main housing member 420 and cap member 440 may be permanently interconnected (e.g., adhered) or, the cap member 440 may be releaseably interconnected to the main housing member 420. In the latter regard, the cap member 440 may be removable to permit replacement of the pump 406. What is important is that interconnection between the main housing member 420 and cap member 440 is operative to maintain fluid within the housing 450 (e.g., a fluid tight connection).

Referring again to FIGS. 9 and 10, an exploded perspective and an assembled cross-sectional view of the water pollution prevention apparatus 400 is illustrated. As shown, the main housing member 420 and cap member 440 define an internal volume that houses the pump 406. In this regard, an inside surface of the main housing member 420 is sized to receive and support the pump 406 such that an impeller 408 of the pump 406 is disposed near a fluid inlet 426 near the bottom of the main housing 420. Further, the internal volume defined by the main housing member 420 and cap member 440 is sized such that a space exits between the inside surface of those members 420, 440 and an outside surface of the pump 406. This space is utilized as a fluid flow path between the fluid inlet 426 into the internal volume and the vertical discharge 442. Further, this space may be sized to achieve a desired flow characteristic (e.g., pressure, volume), as is more fully discussed herein.

As shown, the impeller 408 is interconnected to a rotational axis of an electrical motor of the pump 406 such that, during operation, the impeller 408 and one or more vanes disposed thereon are rotated to displace fluid. The rotation of the impeller 408 displaces fluid upwardly around at least a portion of the outside surface of the pump to the vertical discharge 442. This fluid flow around the pump 406 may provide cooling for the motor of the pump 406. In the embodiment shown, the entirety of the pump 406 is immersed in fluid when fluid is discharged out of the vertical discharge 442. As will be appreciated, this immersion may provide enhanced cooling of the pump motor. However, other pumping devices may be utilized as well. Such pumping device may include, without limitation, rotary pumps and positive displacement pumps.

As shown, an inside periphery of the main housing member 420 includes a plurality of upwardly extending studs 422 that are separated by a plurality of spaces 424. The studs 422 define an annular shelf that is sized to supportably engage an apron 410 extending downwardly from the pump 406. Once the apron 410 of the pump is disposed on the studs 422, the spaces 424 between the studs 422 form apertures through the annular shelf. These apertures permit fluid to flow from the impellor 412 upwardly to the vertical outlet 442. Referring to FIG. 10 it will be noted that fluid may be drawn through the inlet 426 by the impeller 408 then displaced upwardly between the inside surface of the main housing 420 and the outside surface of the pump 406. The fluid may proceed through the apertures 424 between the studs 422 and then continue upwardly through the main housing member 420, through the cap member 440 and through the vertical discharge 442, which defines the fluid outlet 444 of the housing 450. In addition to the studs 424, which vertically support the pump 406, the interior surface of the main housing member 420 may further include one or more vertical vanes (not shown) that allow for laterally positioning the pump 406 within the interior volume of the housing 450 while allowing vertical fluid flow through the housing 450.

The size and number of the spaces 424 may be selected for fluid flow purposes. For instance, the required size of the flow path through the housing 450 may be related to the power and or displacement of the pump as well as the vertical height to which the pump 406 is designed to pump fluid. Accordingly, the physical characteristics of the spaces 424 may be selected in accordance with one or more pump requirements.

The grate member 412 includes a plurality of inlets 418 disposed about its periphery. These inlets 418 are sized to prevent debris in the bilge from entering into the grate member 412 where they may be drawn into the inlet 426 of the housing 450. As shown, grate member 412 includes a shelf 414 disposed about its inside periphery that is sized to support a housing apron 430 that extends downwardly from the main housing body 420. When interconnected, the grate member 412 may provide the support necessary to maintain the housing 450 in an upright position.

As shown, the grate member 412 is removably interconnected to the main housing member 420. Specifically, first and second opposing tabs 416a, 416b are interconnected to opposing outside surfaces of the grate member 412. The tabs 416a and 416b are sized to extend over an outside surface of the main housing member 420. Accordingly, the outside surface of the main housing member 420 includes first and second contact surfaces for engaging the tabs 416a, 416b. As shown, these contact surfaces are formed as sockets 428a, 428b that are sized to receive the tabs 416a, 416b. In this embodiment, each tab 416 includes a tapered tip that allows the tab to be deflected inwardly as it is disposed through the corresponding socket 428. Once disposed a predetermined distance through the socket 428, a lip on the tab 416 is operative to catch a horizontal edge (e.g., top edge) of the corresponding socket 428. Accordingly, by depressing the tabs 416, 418 inwardly, the housing 450 may be vertically lifted and thus separated from the grate member 412.

The grate member 412 may be fixedly connected to the bottom surface of a bilge utilizing, for example, one or more fasteners, which may extend through apertures 415 in the bottom surface (e.g., base) of the grate member 412. In this regard, the apparatus 400 may be periodically disassembled for maintenance of the grate member (i.e., cleaning of the inlets 418 and/or replacement of the housing and pump as necessary.

Other features of the pump 406 also warrant discussion herein. For instance, as shown by FIGS. 9 and 10, the pump 406 includes an electrical connector 402 that extends through the cap member 440. In this regard, the cap member 440 may include an aperture (not shown) through which the electrical connector 402 passes and may further include a grommet to fluidly seal that aperture. Further, it should be noted that while the vertical discharge 442 is centered on the cap member 440 in the illustrated embodiment such centering is not required. It will be further appreciated that a horizontal discharge may also be utilized so long as the horizontal discharge is a predetermined distance above the base as defined by the grate member 412. That is, a horizontal discharge may be utilized so long as an adequate distance between the base and the horizontal discharge is provided to allow the floating petrochemical absorber 404 to travel along an outside surface of the housing 450 between, for example, a minimum and maximum bilge fluid level (i.e., path of travel). The length of the path of travel may be selected such that the absorber can freely move between a high fluid level (e.g., which results in activation of the pump) and a low fluid level (e.g., where the pump may be deactivated). For instance, it may be desirable for the outlet of the pump to be at least about 4 inches above the base of the pump to provide a path of travel having an adequate length to allow for free movement of the absorber.

As shown in FIG. 7, an outwardly extending lip 446 (e.g., stop) is interconnected to the cap member 440 that limits the vertical movement of the floating absorber 404. However, it will be appreciated that the lip 446 is not necessary for operation of the apparatus 400. For instance, a floating petrochemical absorber 404 may be maintained about a housing 450 without out a lip by selectively operating the pump 406 at predetermined fluid levels within the bilge. For instance, referring to FIG. 7 it may be desirable to begin operation of the pump at a maximum fluid level such that the bottom edge of the floating absorber 404 does not float above a top edge of the housing 450. In this regard, the housing 450 may maintain a lateral position of the floating absorber 404 within the bilge 118 without utilizing the lip 446. Of further note, it may be desirable that the floating petrochemical absorber 404 have a thickness "t" that is greater than the height "h" of the inlets 418 of the grate member 412. In this regard, as the fluid level drops within the bilge 118, the absorber 404 may settle on the bottom surface of the bilge and still provide isolation for the inlets 418.

Of further note, it may be desirable that an outside surface of the pump housing 450 be free of protrusions that may hinder movement of the absorber 404. In this regard, the outside surface of the housing 450 may be substantially vertical (e.g. cylindrical) or may be tapered to reduce the likelihood of the absorber 404 becoming caught on the housing 450.

It is anticipated that those skilled in the art will appreciate numerous other examples that are within the scope of the present invention. For instance, it will be appreciated from the above embodiment, that the double housing design of the locator 102 and semi-enclosed design of the absorber 104, accommodates bilge pumps, such as pump 106, that include an outlet conduit 116 connected out the side of the pump. Alternatively, however, a locator having a single locator housing and single locator channel may be utilized with bilge pumps having their outlet conduit out the top of the pump housing. Those skilled in the art will appreciate numerous methods of accomplishing the single locator and enclosed absorber design. For instance, the locator channel may be configured in the shape of a "T" with a mating "T" shaped connector utilized on the enclosed absorber to make the slidable connection there between. Similarly, it is possible to utilize this single locator and enclosed absorber design with the bilge pump 106, where the outlet conduit 116 is routed up and over the top of the locator. In this case, it may be desirable to make the interior space, e.g., 120, of the absorber larger so that it accommodates enclosure of the pump 106 as well as the routing of the outlet conduit 116, to prevent interference during movement of the absorber along the locator. In an alternate embodiment, where the pump housing acts as the locator for a fully enclosed absorber, the discharge of the pump may be a horizontal discharge.

In another alternative embodiment and regardless of the terminology used herein, the absorber 104 may comprise a material that is impervious to petrochemicals 300, rather than a material that absorbs petrochemicals 300. In this case, the absorber 104 would not remove petrochemicals 300 from the fluid 112, but would still function to isolate the bilge pump 106 and thereby minimize the discharge of petrochemicals 300 as it would minimize entry of the same into the interior area 120.

Those skilled in the art will appreciate variations of the above-described embodiments that fall within the scope of the invention. As a result, the invention is not limited to the specific examples and illustrations discussed above, but only by the following claims and their equivalents.

The invention claimed is:

1. A bilge pump for removing fluid from a bilge of a marine vessel, comprising:
    a pump housing having a base, a sidewall and a top surface defining an internal volume, wherein the base is adapted for disposition relative to a bilge surface;
    at least one opening within the pump housing proximate to the base for allowing bilge fluid into the internal volume;
    a fluid outlet extending out of the top surface of the pump housing; and
    a fluid pumping device at least partially disposed within the internal volume, wherein the fluid pumping device is operative to pump fluid within the internal volume through the fluid outlet;
    a floating petrochemical absorber having a closed internal area, wherein the pump housing is disposed within the internal area and wherein a maximum horizontal cross-dimension of the pump housing between the base and a first sidewall height above the base is less than a corresponding internal cross-dimension of the internal area of the petrochemical absorber and wherein a horizontal cross-dimension at the first sidewall height is greater than said internal cross-dimension of the absorber.

2. The bilge pump of claim 1 wherein the petrochemical absorber is movable with a level of fluid within the bilge.

3. The bilge pump of claim 2, wherein a thickness of the petrochemical absorber is greater than a maximum height of the at least one opening as measured from the base.

4. The bilge pump of claim 1 wherein the housing further comprises:
    a stop located at said first sidewall height wherein said stop is adapted to prevent vertical movement of the petrochemical absorber beyond a predetermined height above the base.

5. The bilge pump of claim 1, further comprising a fluid activated switch operatively connected to the fluid pump, wherein the fluid activated switch initiates operation of the fluid pump when bilge fluid in a bilge of a marine vessel reaches a first predetermined level and terminates operation of the fluid pump when the bilge fluid reaches a second predetermined level that is lower than the first predetermined level.

6. The bilge pump of claim 1, wherein the fluid pumping device further comprises:
    an electric motor for operating the fluid pumping device.

7. The bilge pump of claim 6, wherein the electric motor is entirely disposed within the internal volume of the pump housing.

8. The bilge pump of claim 6, wherein at least a portion of an outside surface of the electrical motor is disposed in a fluid flow path between the fluid pumping device and the vertical fluid outlet, wherein fluid moving through the fluid flow path provides cooling for the electric motor.

9. The bilge pump of claim 6, wherein an entirety of the electrical motor is immersed in fluid when the fluid pumping device is pumping fluid through the fluid outlet.

10. The bilge pump of claim 1, wherein the pump housing comprises a body member and a base member removably connectable to the body member, wherein the base member includes the base and the at least one opening.

11. The bilge pump of claim 10, wherein the body member houses the fluid pumping device.

12. The bilge pump of claim 10, wherein the base member further comprises:
    a plurality of openings, the plurality of openings defining a strainer for impeding entry of debris into the internal volume.

13. The bilge pump of claim 10, wherein the base member further comprises:
    first and second tabs extending substantially normal from the base, wherein the first and second tabs each comprise an engagement surface for selectively engaging the body member.

14. The bilge pump of claim 13, wherein the body member includes first and second contact surfaces adapted to releaseably engage the first and second tabs.

15. The bilge pump of claim 14, wherein an outside surface of the pump housing comprises first and second recessed surfaces for receiving the first and second tabs.

16. A bilge pump for removing fluid from a bilge of a marine vessel, comprising:
    a pump housing having a sidewall and a base for disposition relative to a bilge surface;
    at least one inlet opening proximate to the base of the pump housing for allowing bilge fluid into the pump housing;
    a fluid outlet extending out of the pump housing at a location above the at least one inlet as measured from the base;
    a petrochemical absorber defining a closed geometric shape and having an internal area, wherein the pump housing is disposed within the internal area, and wherein a maximum horizontal cross-dimension of the pump housing between the base and a first sidewall height above the base is less than a maximum cross-dimension of the internal area of the petrochemical absorber; and
    a stop interconnected to an outside surface of the sidewall at the first sidewall height, wherein a maximum horizontal cross-dimension at the first sidewall height is greater than the maximum internal cross-dimension of the absorber.

17. The pump of claim 16, wherein the absorber is operative to move along an outside surface of the pump housing between the base and the first sidewall height in correspondence with a fluid level within the bilge.

18. The pump of claim 16, wherein the maximum horizontal cross-dimension of the pump housing is less than a minimum cross-dimension of the internal area.

19. The pump of claim 16, wherein an outside surface of the pump housing is substantially circular and the internal area is substantially circular.

20. The pump of claim 16, wherein the first sidewall height is at least 4 inches above the base.

21. The pump of claim 20, wherein the first sidewall height is at least 5 inches above the base.

22. The pump of claim 16, wherein the fluid outlet exits the pump housing above the first sidewall height.

23. The pump of claim 22, wherein the fluid outlet extends out of a top surface of the pump housing.

* * * * *